United States Patent [19]

Cochrane

[11] 4,229,622

[45] Oct. 21, 1980

[54] MULTIPLEXING SPEECH SIGNALS

[75] Inventor: Peter Cochrane, Ipswich, England

[73] Assignee: The Post Office, London, England

[21] Appl. No.: 886,550

[22] Filed: Mar. 14, 1978

[30] Foreign Application Priority Data

Mar. 15, 1977 [GB] United Kingdom ............... 10846/77

[51] Int. Cl.² ............................................. H04B 1/66
[52] U.S. Cl. ................................. 370/81; 179/15.55 R
[58] Field of Search ....... 179/15 AS, 15 AQ, 15 BW, 179/1 SA, 15.55 R

[56] References Cited

U.S. PATENT DOCUMENTS

| | | | |
|---|---|---|---|
| 2,388,001 | 10/1945 | Loughren | 179/15 AS |
| 2,564,419 | 8/1951 | Brown | 179/15 AS |
| 3,030,450 | 4/1962 | Schroeder | 179/1 SA |
| 3,424,869 | 1/1969 | Anderson et al. | 179/15 AS |
| 4,032,719 | 6/1977 | Blasbalg | 179/15 AQ |
| 4,100,377 | 7/1978 | Flanagan | 179/15 AS |
| 4,131,765 | 12/1978 | Kahn | 179/15.55 R |

FOREIGN PATENT DOCUMENTS 1031984  6/1966  United Kingdom ............... 179/15 AQ

*Primary Examiner*—Malcolm A. Morrison
*Assistant Examiner*—E. S. Kemeny
*Attorney, Agent, or Firm*—Kemon and Estabrook

[57] ABSTRACT

To transmit a number of individual speech channels over a smaller number of transmission channels, the frequency range of each speech channel is broken into sub-channels and each of these is considered separately for operational activity. Composite speech signals are then formed from the active frequency sub-channels of the individual speech channels and these are transmitted with coding signals indicative of their composition.

8 Claims, 5 Drawing Figures

Telephone speech channel divided into 'n' sub-channels.

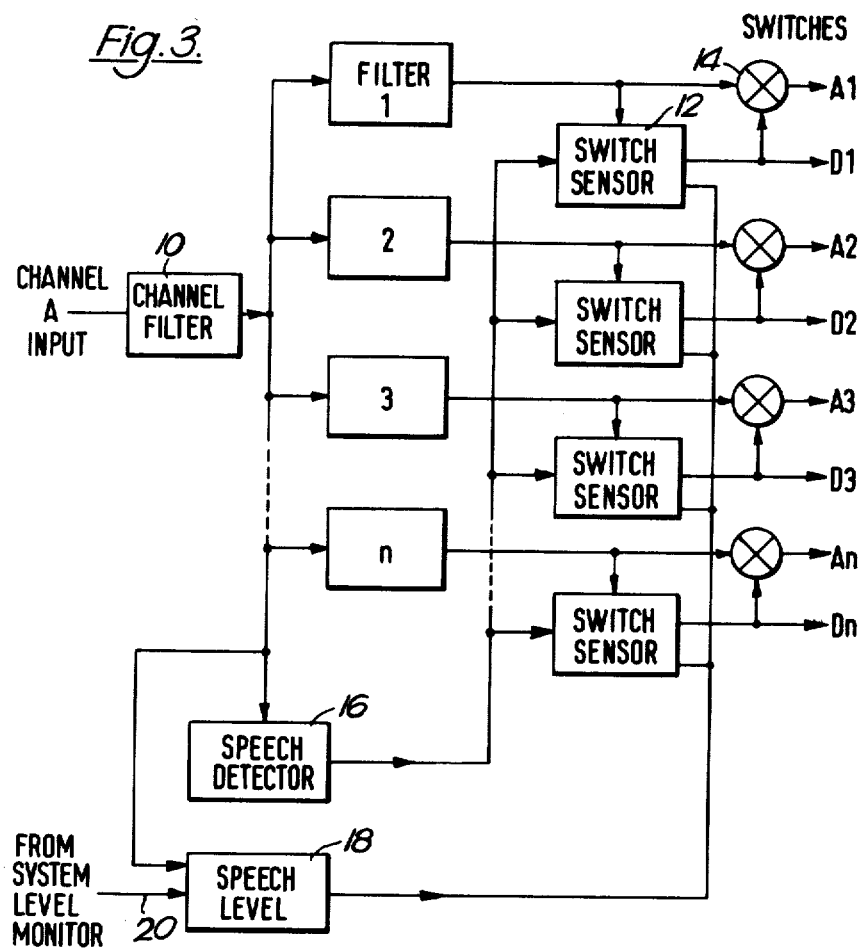

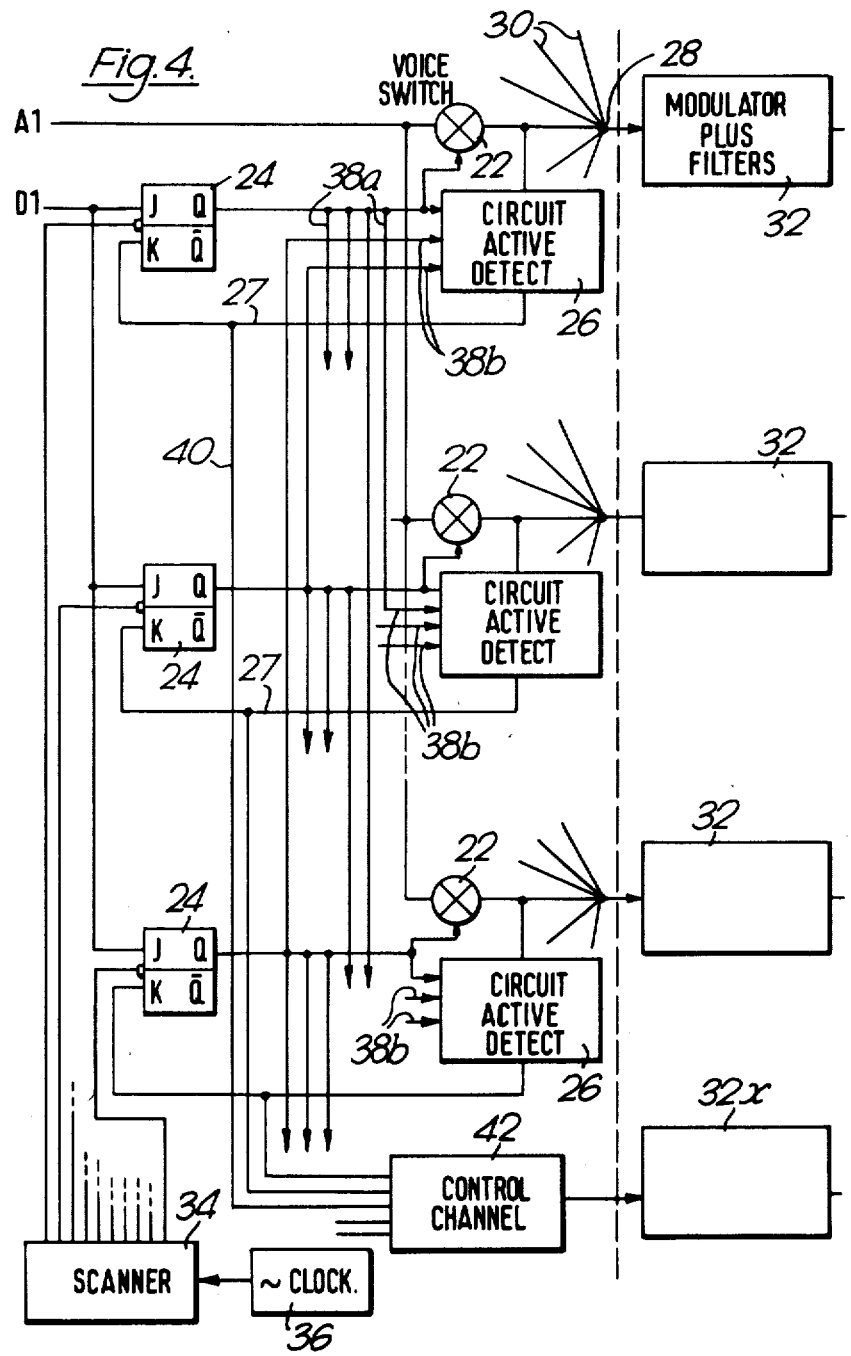

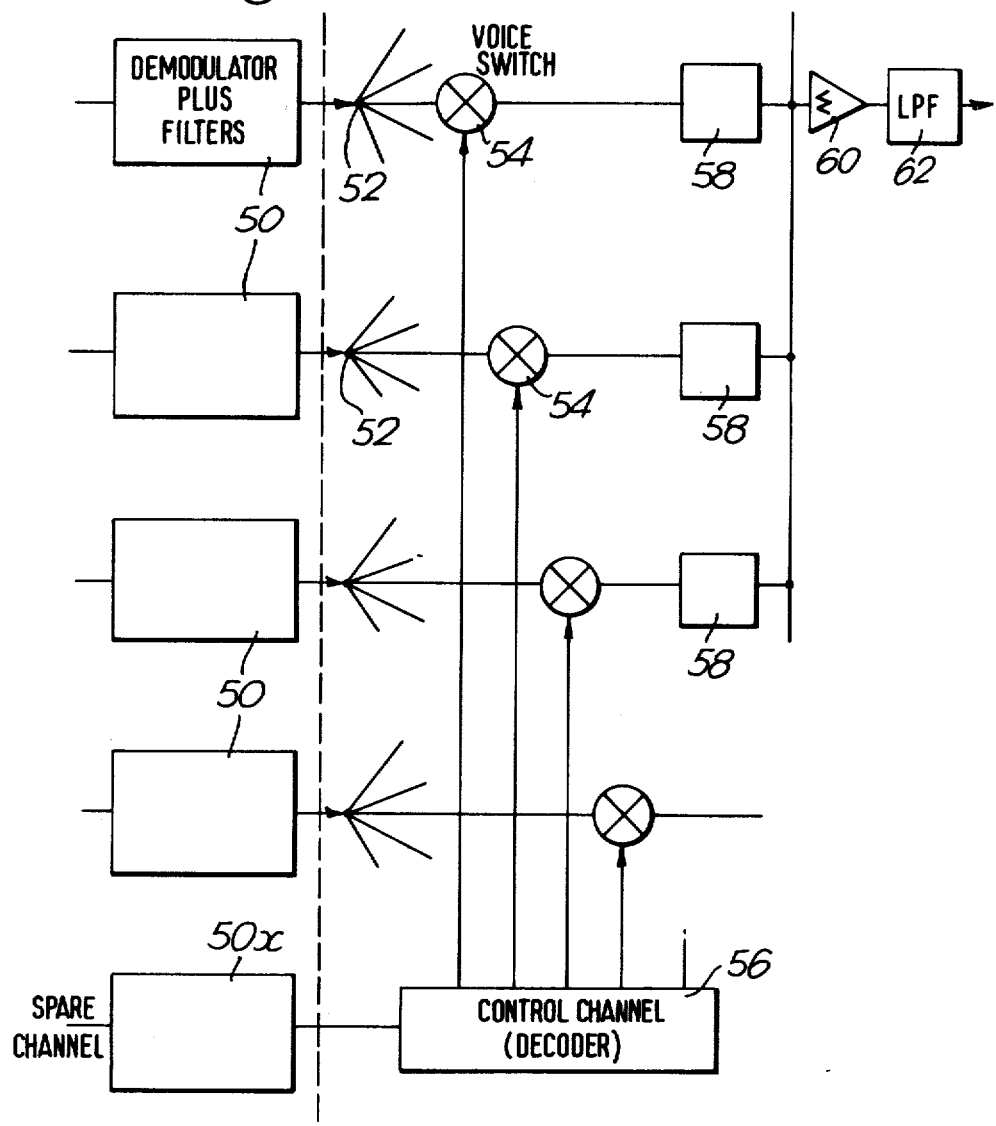

MULTIPLEXING SPEECH SIGNALS

It is known to transmit a number of signals over a single signal channel by means of multiplex techniques. Thus, in frequency multiplex, a number of signals may be modulated on separate carriers within the transmitted frequency range, the individual carrier signals being extracted by filtering and then demodulated at the receiver.

In an alternative form of multiplex transmission (time multiplex), a number of individual signals are sampled at intervals and the samples corresponding to the different signals are then interleaved to form a composite signal for transmission. At the receiver the composite signal is sampled and the samples distributed in synchronism with the sampling of the individual signals at the transmitter, and the individual signals are then reconstituted from the samples.

A more complex form of multiplexing is that known as "time assignment speech interpolation", which is mainly employed in submarine cable telecommunications systems to provide a higher operational density of the available speech channels. Time assignment speech interpolation takes advantage of the naturally occurring silent periods in conversational speech. Electronic equipment is used to make a transmission channel available for any individual speech channel found to be active, the inactive individual speech channels (i.e. those experiencing a silent period), being "frozen out". Thus speech waves from a number of different active channels are interleaved in a single transmission channel and in this way more simultaneous conversations can be conveyed than the number of available independent transmission channels.

Other proposals have involved band width reduction of each speech channel by dividing speech into high frequency and low frequency sounds and transmitting both high and low frequency sounds within the reduced band-width. Thus, in U.S. Pat. No. 3,158,693, each burst of speech activity in a speech channel is divided into high and low frequency bands, the low frequency band being transmitted directly in the reduced band-width channel and the high frequency band being delayed for the duration of its own energy burst and then transmitted along the same reduced band-width channel, i.e. in the silent interval following the burst. In U.S. Pat. No. 2,810,787, speech channels are reduced in band-width and are frequency multiplexed. For each speech channel, a sensor switching circuit applies to an output either the low frequency signals or the high frequency signals of the speech channel, according to whether the activity present in the speech channel at that time is primarily low frequency or primarily high frequency. To achieve band-width compression, either the high frequency or the low frequency signals are subjected to a frequency shift so that they occupy the same frequency range in the frequency multiplexed signal resulting from all the speech channels.

A method according to the present invention for transmitting a number of individual speech channels over a smaller number of transmission channels comprises: sensing for each channel the operational activity of each of a number of frequency sub-channels within the frequency range of that speech channel; forming, from the signals in the said frequency sub-channels of the individual speech channels, at least one composite speech signal having frequency sub-channels some or all of which contain sub-channel signals from two or more of the individual speech channels, whereby the frequency sub-channels of the composite speech signal are more fully occupied than those of the individual signals; and transmitting the composite speech signal with a coding signal representing the manner in which the individual speech channel signals have been combined to form the composite speech signal.

It will be seen that the method according to the present invention permits a reduction in the number of transmitted channels which is greater than has been possible in the earlier proposals discussed above. Thus, where each speech channel was divided into high and low frequency bands in the earlier proposals, each speech channel had its individual band of reduced width in the transmitted signal and therefore no advantage was taken of the statistical probability that among many occupied speech channels some will have intervals of silence, at least in some parts of the frequency range, while other are active. "Time assignment speech interpolation" takes advantage of the fact that some speech channels are silent throughout their frequency range for intervals in which other channels are active but does not take advantage of the statistical probability that in speech channels which have a burst of speech activity at any time there are some portions of the frequency range which are inactive and could be occupied by active portions of the frequency range of other speech channels. To put this in another way, in "time assignment speech interpolation" speech channel signals are "frozen out" whenever there is silence in the speech channel whilst in the method according to the present invention any frequency sub-channel of a speech channel is "frozen out" whenever there is silence in that sub-channel, whether or not the remaining frequency sub-channels of that speech channel are silent. The method according to the present invention may therefore be regarded as "time and frequency assignment speech interpolation".

It will be seen that the present invention thus exploits frequency spectrum redundance in the speech signals to be transmitted.

Methods embodying the invention may incorporate modifications of the method set out above. Thus, if desired, a frequency sub-channel of a speech signal can be relatively time-displaced with respect to other sub-channels of that speech signal in order to further reduce the number of transmission channels required to accommodate a given number of speech channels, the time displacement being suitably encoded and subsequently eliminated at the receiver.

In another form, some frequency sub-channels of the speech signals are frequency shifted to occupy other frequency sub-channels of composite signals, which sub-channels would otherwise be empty, to reduce the number of transmission channels required to transmit a number of speech channels; again, the frequency shift is encoded and subsequently eliminated at the receiver.

In yet another method embodying the invention, a proportion of the speech channel signals is subjected to frequency inversion prior to the sensing of the operational activity of the frequency sub-channels. Such frequency inversion of a proportion of the speech signals tends to render more uniform the occupancy of the sensed frequency sub-channels and thereby to reduce redundancy of sub-channels in the transmission signals.

In order that the invention may be better understood, an example of a method and apparatus embodying the invention will now be described with reference to the accompanying drawings, in which:

FIG. 3 is a block diagram of apparatus for detecting active frequency sub-channels of a speech channel; and FIGS. 4 and 5 illustrates diagrammatically the multiplexing and demultiplexing apparatus, respectively.

FIG. 1 shows the frequency distribution over a period of two seconds for the spoken sentence shown along the time axis. It will be seen that in this period of speech, although the intervals of silence throughout the frequency spectrum are short, some parts of the frequency spectrum have prolonged intervals of silence, particularly if the speech portions of little intensity are disregarded.

Figure 1:
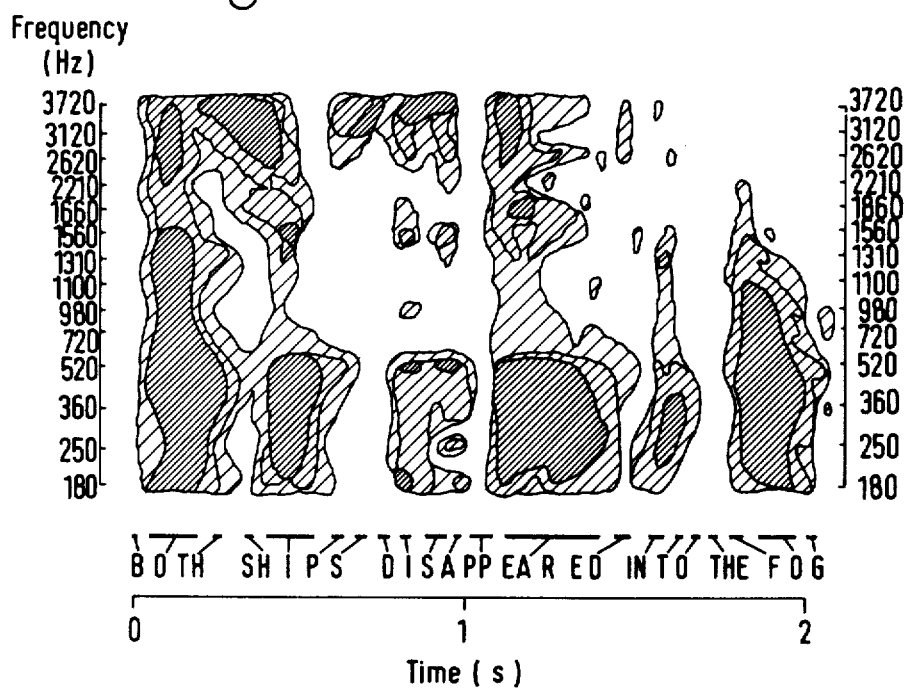
FIG. 1 is a frequency-time graph of a typical speech signal.
Figure 2:
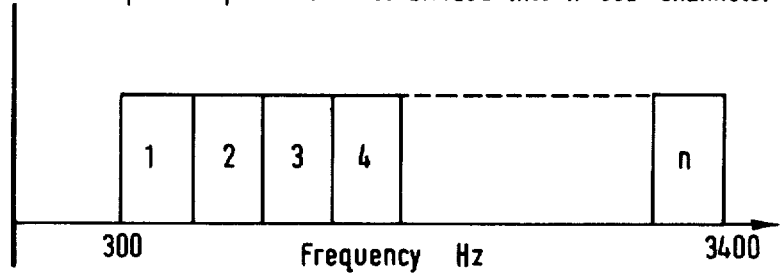
FIG. 2 shows a linear sub-division of a telephone speech channel.

FIG. 2 illustrates a frequency sub-division of the frequency spectrum of a telephone speech channel, the frequency spectrum comprising the range from 300 Hz to 3,400 Hz. A linear sub-division of the telephone speech channel is shown for simplicity, but non-linear frequency band distribution is advantageous because of its ability to exploit the uneven power spectral density distribution of speech, which is more concentrated at lower frequencies as shown in FIG. 1.

FIG. 3 shows the apparatus for detecting speech activity in frequency sub-channels of a single speech channel A. The channel A input is applied to a channel filter 10 and thence to individual filters 1, 2, 3 . . . n which select the speech signals within the frequency sub-channel bands (see FIG. 2) to which they are tuned. Each of these filters 1 to n has its output connected to an individual switch sensor 12 and an individual switch 14.

The output of the channel filter 10 is also applied to a speech detector circuit 16 and to a speech level circuit 18. The speech detector circuit 16 enables the switch sensor 12 whenever a speech signal is present in channel A. The switch sensors act in the manner of comparator circuits, each comparing the level of the sub-channel signal which it receives from its respective sub-channel filter 1, 2, 3 . . . n with a reference level signal. The reference level signal for all these switch sensors is given by a signal from the speech level circuit, the reference level being derived by this circuit from the full-frequency speech signal in channel A and from a line 20 connected to a system level monitor (not shown). When a sub-channel speech level exceeds the reference level, the switch sensor 12 for that sub-channel renders conductive the corresponding switch 14, thereby passing the sub-channel speech signal from the corresponding filter 1, 2. 3 . . . n to the sub-channel output A1, A2, A3 . . . An. At the same time, the same switch sensor 12 applies the sub-channel demand signal to the appropriate line D1, D2, D3 . . . Dn.

It will be seen from FIG. 1 that in a typical burst of speech activity on channel A, some of the frequency sub-channel speech output and demand signal lines (for example A1, D1) are active and the remainder are inactive.

FIG. 4 shows a circuit for allocating any of a number of modulator output sub-channels in standard FDM (frequency discrimination modulation) equipment to a single sub-channel input A1 from FIG. 3. As shown in FIG. 4, the sub-channel speech signal on input line A1 is applied to each of a number of voice switches 22. The corresponding demand signal on line D1 is applied to the J input of each of a corresponding number of JK bistable circuits 24, the Q outputs of which are connected both to the respective voice switches 22 and to respective circuit active detectors 26. The K inputs are connected to the outputs of the respective detectors 26 over lines 27. The signal on each line 27 prevents the operation of the corresponding JK circuit if the detector 26 indicates that the corresponding modulator sub-channel circuit is already active.

The outputs of the voice switches are connected through respective junctions 28 (to which lines 30 from other sub-channel steering circuits are connected) to respective modulator and filter circuits 32 of known design.

A scanner 34 is pulsed by a clock circuit 36. The scanner consists of a circulating shift register, the outputs of which are connected to respective clock inputs of the JK bistable circuits.

Thus, when a speech sub-channel signal is applied to line A1, a corresponding demand signal D1 is applied simultaneously to the JK bistable switches for all the modulators in the drawing. The scanner clocks each of the JK bistable switches in turn. Assuming that a demand signal is present on line D1, the clocking of the bistable circuits 24 continues until a detector 26 is found in a state which indicates that the corresponding modulator sub-channel circuit is inactive. The corresponding JK bistable circuit 24 then switches and the Q output of the bistable circuit renders conductive the corresponding voice switch 22 through which the sub-channel speech signal on line A1 is then applied to the corresponding modulator/filter circuit 32.

When a voice switch 22 is caused to respond to the sub-channel signal, a signal is also transmitted over lines 38a to all other circuit active detectors 26 which are connected to the same modulator 32 and to all other circuit-active detectors which are associated with the same demand signal line (D1 in the drawing). For the detectors 26 shown in FIG. 4 these disabling signals are received over lines 38b.

Additionally, when a JK circuit 24 switches in response to a demand signal on line D1, an encoding signal is transmitted by the corresponding circuit active detector 26 over line 40 to control channel circuit 42. The circuit 42 receives signals from all the steering channels and transmits a composite encoded multi-frequency signal over a spare sub-channel of the frequency modulating equipment by means of a modulator/filter circuit 32x.

It will be seen that each of the modulator/filter circuits 32 shown in FIG. 4 represents a single sub-channel output. At any time, each of these circuits 32 will be occupied by different speech sub-channels, the speech sub-channels being derived from more than one speech channel. Also, each modulator/filter sub-channel circuit 32 is occupied at different times by different speech sub-channels.

FIG. 5 illustrates the demultiplexing and decoding equipment for recovering and reconstituting a signal transmitted by the equipment of FIG. 4. As in FIG. 4, the hardware necessary for only one channel is illustrated, for clarity. In FIG. 5, the modulated sub-channel signals are applied to demodulator/filter circuits 50, which apply corresponding demodulated signals to junctions 52. Each junction 52 is connected to a number of voice switches 54 controlled by a decoding circuit 56. The decoding circuit 56 receives the signal transmitted over the spare frequency multiplexing sub-channel, after demodulation of this signal in the corresponding demodulator/filter circuit 50x. The voice switches 54 are rendered conductive by the decoder 56 is accordance with the received encoded signals. When a voice switch 54 is rendered conductive, the signal at junction 52 is applied through the voice switch to a sub-channel filter 58. All sub-channel filters 58 for a single received speech channel have their outputs connected to a single amplifier 60 in which they are combined, the resultant full-frequency output signal being then applied through a low-pass filter 62 to a transducer (not shown) which reconstitutes the speech in acoustic form.

It will be clear that other modifications of the method embodying the invention are possible; for example each speech sub-channel found to be active may be sampled at regular intervals during its period of activity, the signal samples from a number of speech channels being multiplexed in each frequency sub-channel for transmission and the frequency sub-channels being subsequently reconstituted from the samples at the receiver in the manner of conventional time multiplexing.

We claim:

1. Speech signal multiplexing apparatus comprising, for each input channel, a multiplicity of frequency sub-channel filter circuits; a sensor for determining the level of speech activity in each of the selected frequency subchannels for each of the speech channels and means for forming a composite output signal having frequency sub-channels each of which contains speech subchannel signals from two or more of the individual input speech channels, by allocating each frequency subchannel of a speech channel, while that subchannel is active, to an empty subchannel of the composite signal, the subchannels of any given input signal being at least sometimes assigned to output signal subchannels which are non-contiguous and separated by output signal subchannels corresponding to subchannels of another input signal whereby the frequency subchannels of the composite speech signal are more fully occupied than those of the individual speech signals, and means for including in the composite signal a coding signal indicative of the contents of the said subchannels of the composite output signal.

2. A method of transmitting a number of individual speech channels over a smaller number of transmission channels, comprising:
sensing for each speech channel the operational activity of each of a multiplicity of frequency subchannels within the frequency range of that speech channel and allocating those frequency subchannels of a speech channel which are active to empty cubchannels of an output signal to form at least one composite output signal having frequency subchannels some or all of which contain subchannel signals from two or more of the individual speech channels, the active subchannels of any given input signal being at least sometimes assigned to subchannels of the output signal which are non-contiguous and which are separated in frequency by output signal sub-channels to which are assigned subchannels of another input signal whereby the frequency subchannels of the composite speech signal are more fully occupied than those of the individual signals; and transmitting the composite speech signal with a coding signal representing the manner in which the individual speech channel signals have been combined to form the composite speech signal.

3. A method in accordance with claim 2, further comprising time-division sampling of each frequency sub-channel found to be active in a speech channel signal, the resulting frequency sub-channel signal samples from a number of speech channels being time-division multiplexed in each frequency sub-channel of the said composite speech signal for transmission.

4. Speech signal multiplexing apparatus in accordance with claim 1, in which the sensor for each input subchannel includes a comparator receiving firstly the signal from the corresponding input sub-channel filter and secondly a reference level signal, and generating an output signal whenever the sub-channel input signal exceeds the reference level.

5. Apparatus in accordance with claim 4, further including a respective switching means connected to receive each input sub-channel signal and rendered operative to pass the sub-channel signal by the said sensor.

6. Apparatus in accordance with claim 5, in which the sensor, when effective to render operative the said switching means for an input sub-channel, also generates a demand signal, the apparatus further including steering circuits responsive to the demand signals of different speech input sub-channels to allocate the corresponding speech input sub-channel signals to different frequency sub-channels of a multiplexed output signal.

7. Apparatus in accordance with claim 6, in which the steering circuits include, for each sub-channel of each input speech channel, a number of switching circuits, each able to connect the said input sub-channel signal to any one of a number of sub-channels of a composite output signal, and scanning means adapted to scan the said output sub-channels to cause the occupied or unoccupied condition of each output sub-channel to be sensed, the corresponding switching circuit applying the input sub-channel signal to the first unoccupied output sub-channel to be sensed.

8. Speech signal demultiplexing apparatus for receiving a speech signal transmitted by the apparatus of claim 1, comprising a demodulator for each sub-channel of a received multiplexed signal and further comprising, for each speech signal receiving channel, a plurality of voice switches respectively connected to the output of different ones of the demodulators, the apparatus additionally comprising a decoding circuit connected to receive the transmitted encoding signal and adapted to render the voice switches conductive as required by the encoding signal to apply speech sub-channel signals passed by the voice switches to the said speech receiving channel, whereby the speech receiving channel receives a reconstituted signal including a plurality of sub-channel signals passed by the corresponding voice switches.

* * * * *